US00RE48019E

(19) United States
(12) Reissued Patent
Sancilio et al.

(10) Patent Number: US RE48,019 E
(45) Date of Reissued Patent: Jun. 2, 2020

(54) MOLD FOR A MEDICAL DOSAGE FORM

(71) Applicant: TherapeuticsMD, Inc., Boca Raton, FL (US)

(72) Inventors: Frederick D. Sancilio, Palm Beach Gardens, FL (US); Thorsteinn Thorsteinsson, Boynton Beach, FL (US); Julia M. Amadio, Boca Raton, FL (US)

(73) Assignee: TherapeuticsMD, Inc., Boca Raton, FL (US)

(21) Appl. No.: 29/699,417

(22) Filed: Jul. 25, 2019

Related U.S. Patent Documents

Reissue of:
(64) Patent No.: Des. 811,454
Issued: Feb. 27, 2018
Appl. No.: 29/575,454
Filed: Aug. 25, 2016

(51) LOC (12) Cl. ..... 15-09
(52) U.S. Cl.
USPC ..... D15/136
(58) Field of Classification Search
USPC ..... D15/135, 136
CPC .... B29C 45/33; B29C 45/4421; G01N 13/00; G01N 33/15; G01N 2013/006; Y10S 425/005; Y10S 425/058
See application file for complete search history.

(56) References Cited

U.S. PATENT DOCUMENTS

D54,826 S * 4/1920 Bartlett ..... D15/136
D97,216 S * 10/1935 Vernin ..... D15/135
4,105,354 A * 8/1978 Bowman ..... B44B 5/0009 172/540
4,566,911 A * 1/1986 Tomita ..... B08B 1/04 134/6
5,562,255 A * 10/1996 Witko ..... B02C 18/142 241/158
D419,574 S * 1/2000 Bower ..... D15/131
6,299,698 B1 * 10/2001 Emami ..... B08B 1/04 134/6
6,557,202 B1 * 5/2003 Bliven ..... B08B 1/04 15/102
6,684,447 B2 * 2/2004 Mihara ..... B08B 1/04 15/102
D505,434 S * 5/2005 Bordignon ..... D15/136
D622,920 S * 8/2010 Bejtlich, III ..... D32/40
D682,497 S * 5/2013 Wargo ..... D15/138
D707,408 S * 6/2014 Ishibashi ..... D32/25
D707,517 S * 6/2014 Aglassinger ..... D8/62
D772,517 S * 11/2016 Schiltz ..... D34/29
(Continued)

*Primary Examiner* — Philip S Hyder
(74) *Attorney, Agent, or Firm* — Sterne, Kessler, Goldstein & Fox P.L.L.C.

(57) CLAIM

The ornamental design for a mold for a medical dosage form, as shown and described.

DESCRIPTION

FIG. 1 is a perspective view of the mold for a medical dosage form of the instant invention;
FIG. 2 is a front view thereof;
FIG. 3 is a rear view thereof;
FIG. 4 is a right side view thereof;
FIG. 5 is a left side view thereof;
FIG. 6 is a top plan view thereof; and,
FIG. 7 is a bottom plan view thereof.
The broken lines shown in the figures (portions of the design shown in broken/dashed lines) are included for the purpose of illustrating environment and form no part of the claimed design.

1 Claim, 7 Drawing Sheets

Figure 1:
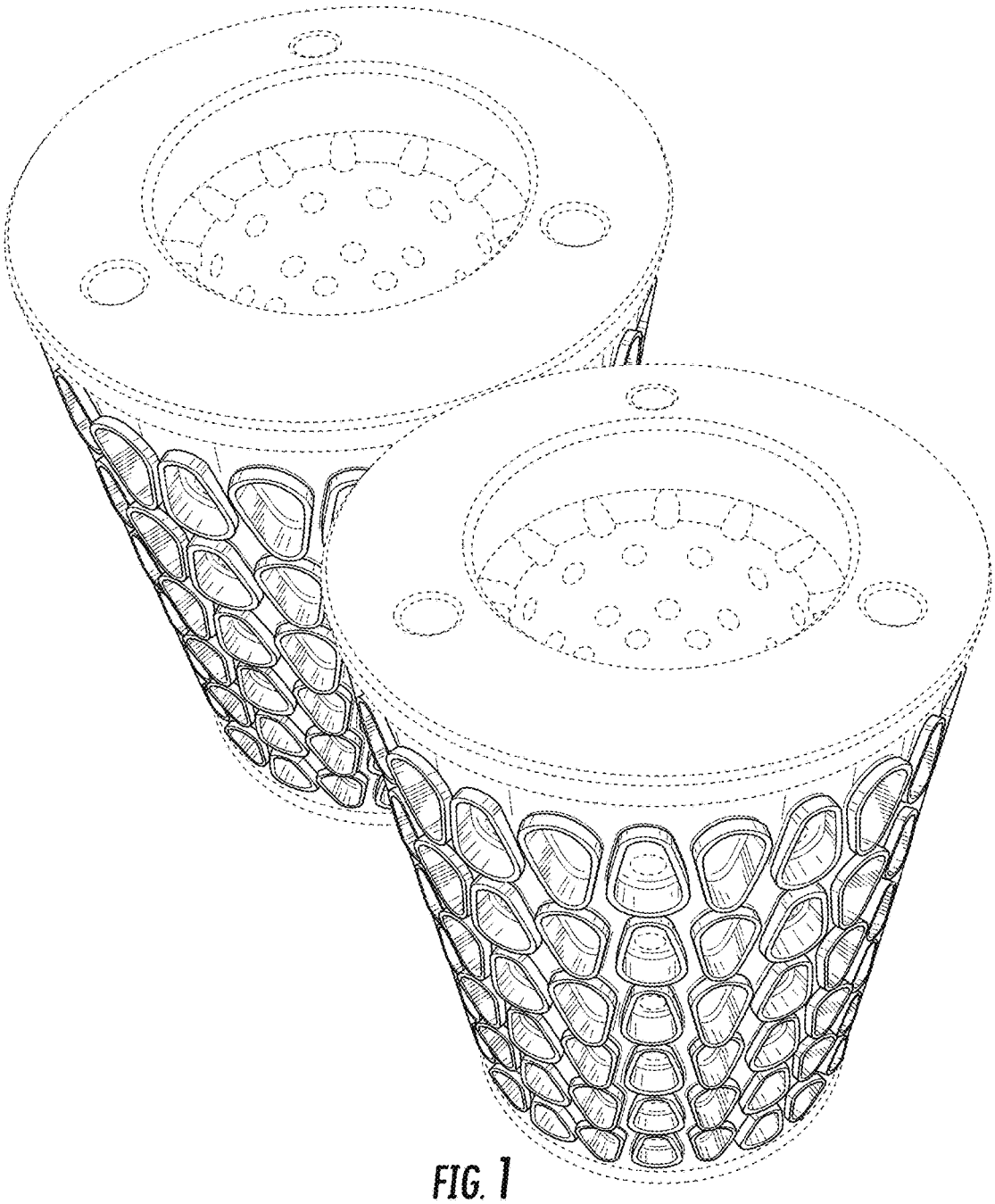
Figure 2:
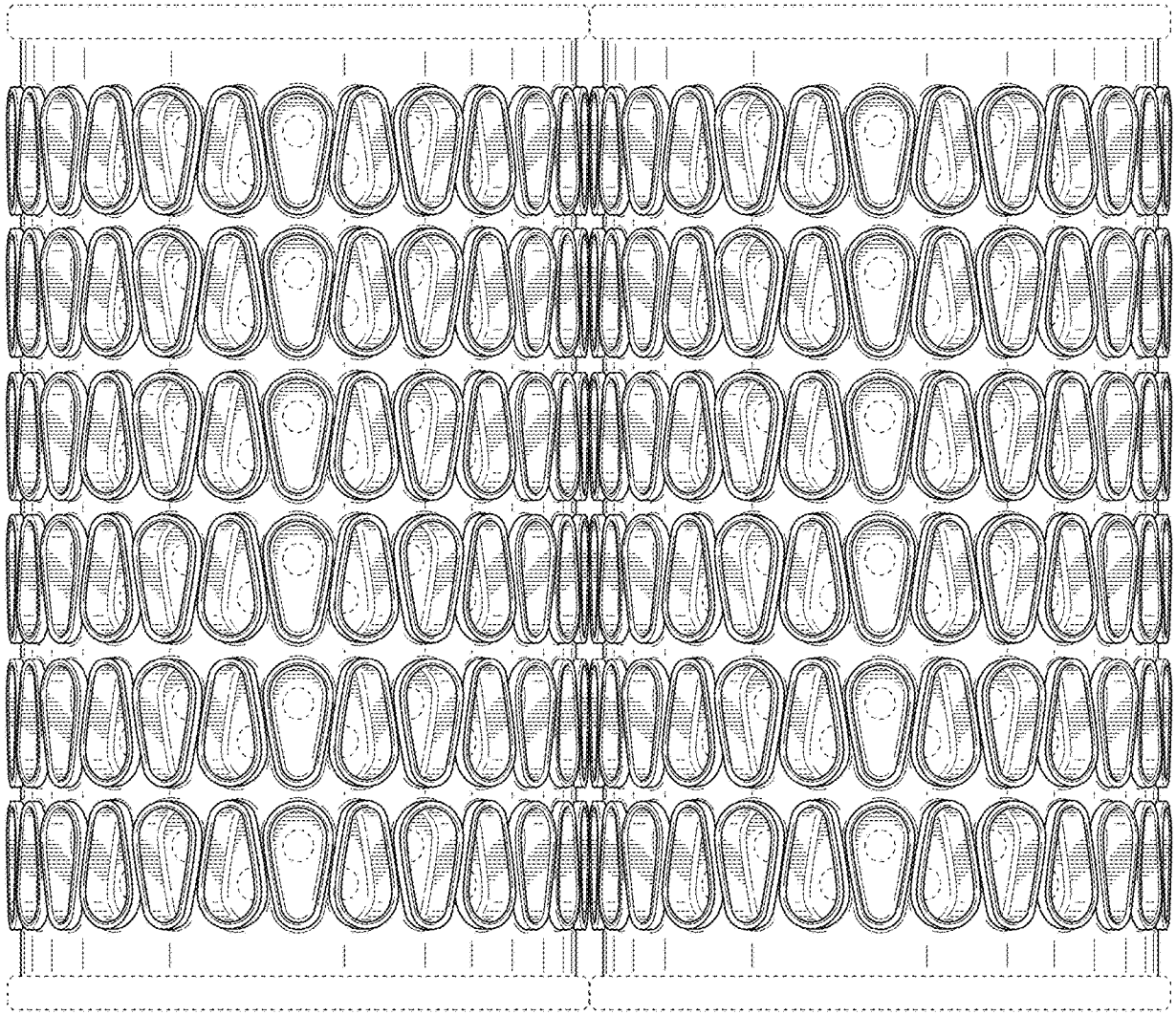
Figure 3:
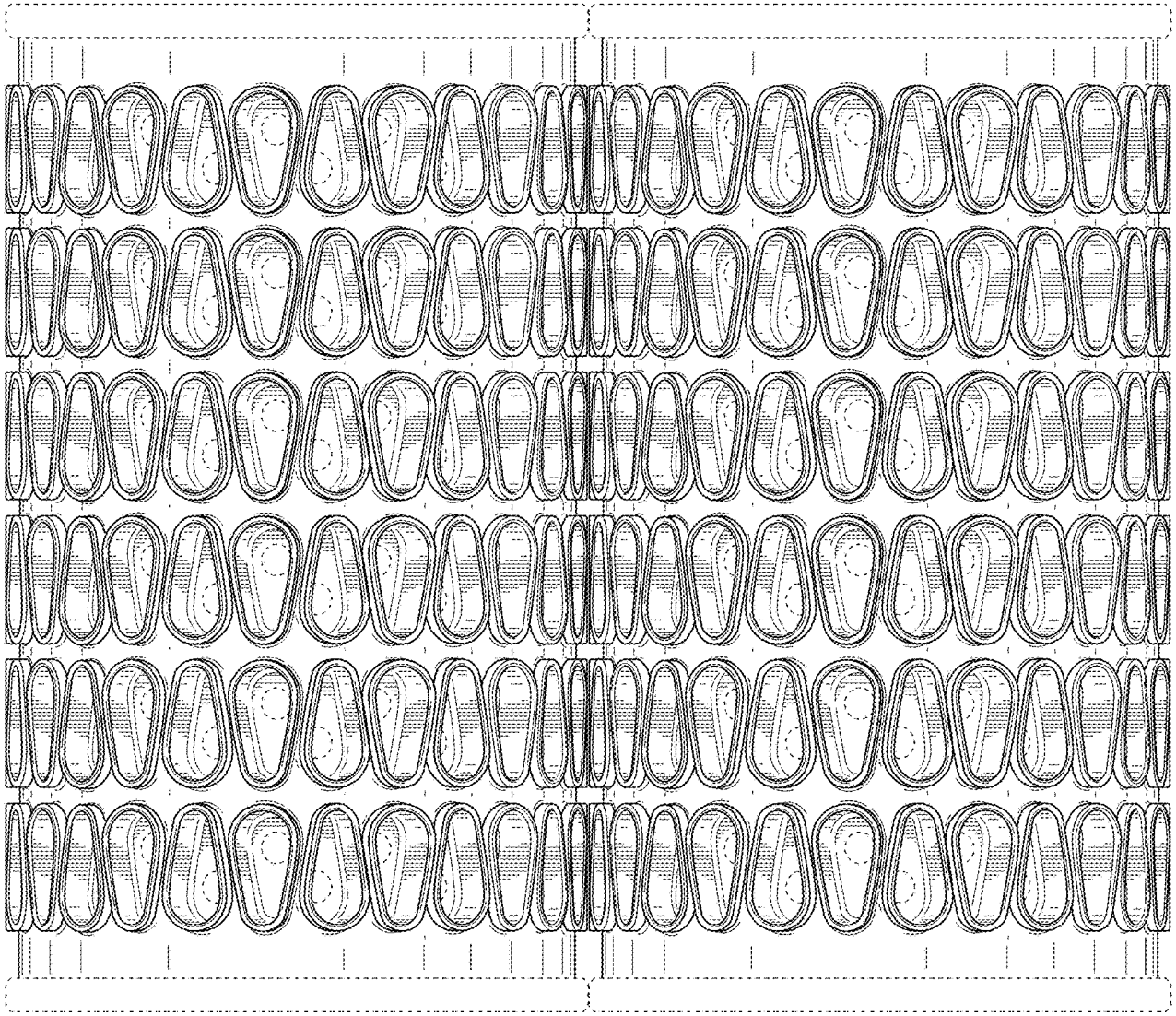
Figure 4:
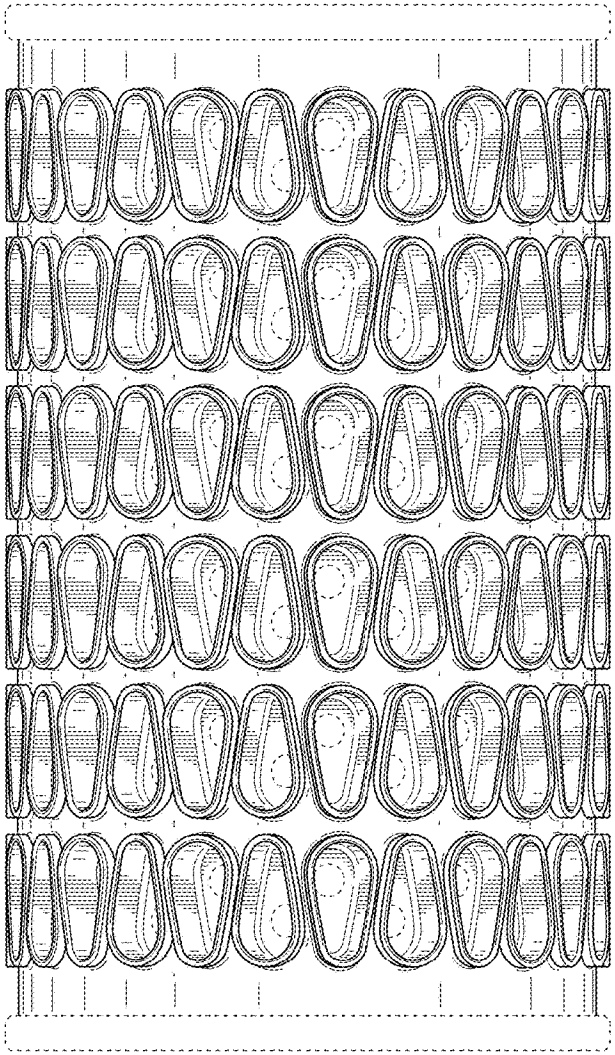
Figure 5:
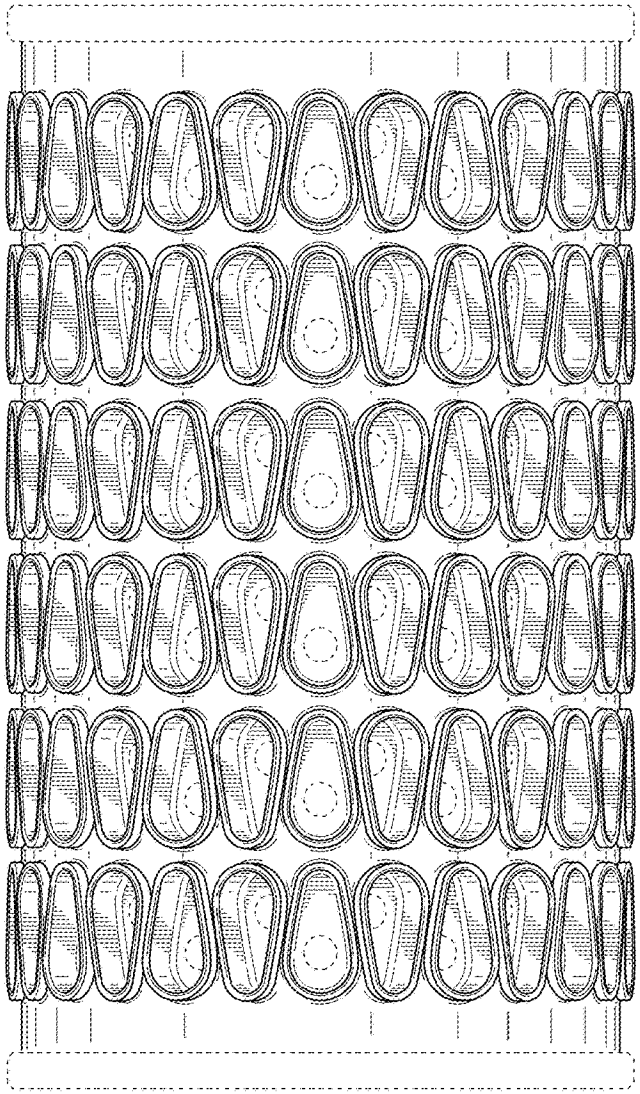
Figure 6:
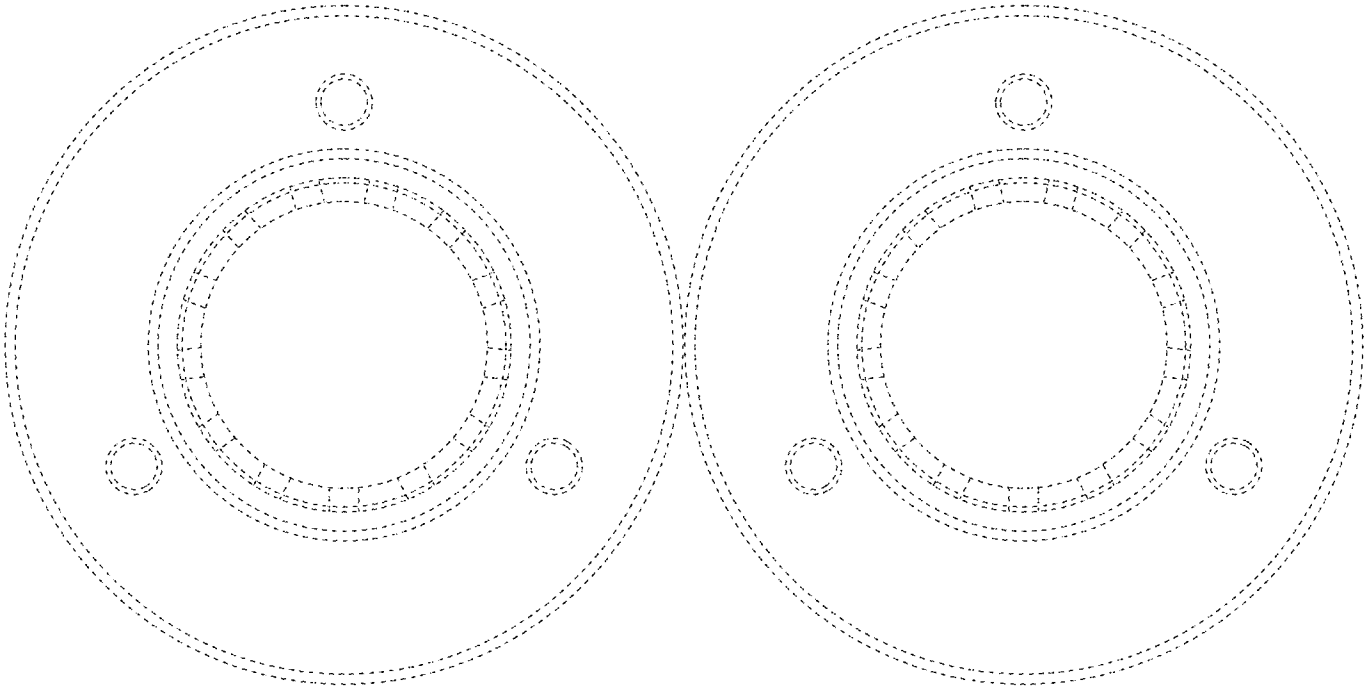
Figure 7:
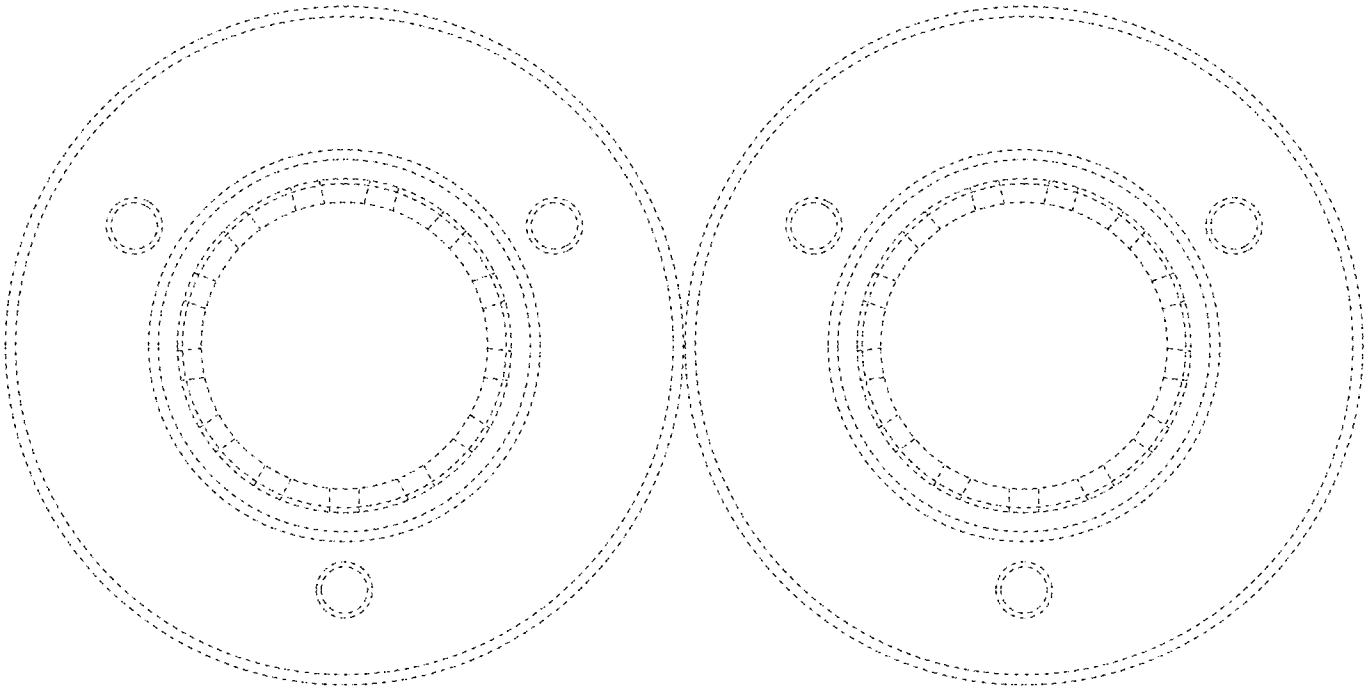

Matter enclosed in heavy brackets [ ] appears in the original patent but forms no part of this reissue; matter printed in italics indicates the additions made by reissue.

(56) References Cited

U.S. PATENT DOCUMENTS

| | | | | |
|---|---|---|---|---|
| D799,768 | S * | 10/2017 | Ishibashi | D32/25 |
| D801,518 | S | 10/2017 | Amadio et al. | |
| 2008/0141475 | A1 * | 6/2008 | Drury | B29C 44/385 15/104.93 |
| 2017/0073091 | A1 * | 3/2017 | Deutschle | B65D 5/68 |

* cited by examiner